United States Patent
Brandon et al.

(10) Patent No.: US 12,205,211 B2
(45) Date of Patent: Jan. 21, 2025

(54) EMOTION-BASED SIGN LANGUAGE ENHANCEMENT OF CONTENT

(71) Applicant: Disney Enterprises, Inc., Burbank, CA (US)

(72) Inventors: Marc Brandon, Westlake Village, CA (US); Mark Arana, Agoura Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 211 days.

(21) Appl. No.: 17/506,054

(22) Filed: Oct. 20, 2021

(65) Prior Publication Data

US 2022/0358701 A1 Nov. 10, 2022

Related U.S. Application Data

(60) Provisional application No. 63/184,692, filed on May 5, 2021.

(51) Int. Cl.
*G06T 13/00* (2011.01)
*G06F 3/14* (2006.01)
(Continued)

(52) U.S. Cl.
CPC .......... *G06T 13/00* (2013.01); *G06F 3/1423* (2013.01); *G06F 40/20* (2020.01); *G06F 40/58* (2020.01); *G06T 11/00* (2013.01); *G06V 20/40* (2022.01); *G06V 20/41* (2022.01); *G09B 21/009* (2013.01); *G10L 15/22* (2013.01); *G10L 21/055* (2013.01); *G10L 25/57* (2013.01); *G10L 25/63* (2013.01);
(Continued)

(58) Field of Classification Search
None
See application file for complete search history.

(56) References Cited

U.S. PATENT DOCUMENTS 6,327,272 B1 12/2001 Van Steenbrugge
6,483,532 B1 11/2002 Girod
(Continued)

FOREIGN PATENT DOCUMENTS

WO 2018052901 3/2018
WO 2019157344 8/2019

OTHER PUBLICATIONS

International Search Report & Written Opinion for International Application PCT/US2022/025123, dated Jul. 4, 2022.
(Continued)

*Primary Examiner* — Michael J Cobb
(74) *Attorney, Agent, or Firm* — Farjami & Farjami LLP

(57) ABSTRACT

A content enhancement system includes a computing platform having processing hardware and a system memory storing software code. The processing hardware is configured to execute the software code to receive audio-video (A/V) content, to execute at least one of a visual analysis or an audio analysis of the A/V content, and to determine, based on executing the at least one of the visual analysis or the audio analysis, an emotional aspect of the A/V content. The processing hardware is further configured to execute the software code to generate, using the emotional aspect of the A/V content, a sign language translation of the A/V content, the sign language translation including one or more of a gesture, a posture, or a facial expression conveying the emotional aspect.

20 Claims, 7 Drawing Sheets

(51) Int. Cl.
  *G06F 40/20* (2020.01)
  *G06F 40/58* (2020.01)
  *G06T 11/00* (2006.01)
  *G06V 20/40* (2022.01)
  *G09B 21/00* (2006.01)
  *G10L 15/22* (2006.01)
  *G10L 21/055* (2013.01)
  *G10L 25/57* (2013.01)
  *G10L 25/63* (2013.01)
  *H04N 21/242* (2011.01)
  *H04N 21/488* (2011.01)

(52) U.S. Cl.
  CPC ......... *H04N 21/242* (2013.01); *H04N 21/488* (2013.01)

(56) References Cited

U.S. PATENT DOCUMENTS

| | | | |
|---|---|---|---|
| 6,545,685 B1 | 4/2003 | Dorbie | |
| 7,827,547 B1 | 11/2010 | Sutherland et al. | |
| 7,827,574 B1 | 11/2010 | Hendricks et al. | |
| 8,566,075 B1 | 10/2013 | Bruner | |
| 9,215,514 B1 | 12/2015 | Kline | |
| 10,061,817 B1* | 8/2018 | Frenkel | G06F 16/248 |
| 10,375,237 B1 | 8/2019 | Williams et al. | |
| 10,514,766 B2* | 12/2019 | Gates | G06F 3/017 |
| 11,176,484 B1* | 11/2021 | Dorner | G06F 16/738 |
| 11,315,602 B2* | 4/2022 | Wu | G11B 27/034 |
| 2002/0104083 A1 | 8/2002 | Hendricks et al. | |
| 2005/0097593 A1 | 5/2005 | Raley et al. | |
| 2006/0018254 A1 | 1/2006 | Sanders | |
| 2009/0141793 A1 | 6/2009 | Gramelspacher et al. | |
| 2009/0262238 A1 | 10/2009 | Hope et al. | |
| 2010/0254408 A1 | 10/2010 | Kuno | |
| 2011/0096232 A1 | 4/2011 | Dewa et al. | |
| 2011/0157472 A1 | 6/2011 | Keskinen | |
| 2011/0162021 A1 | 6/2011 | Lee | |
| 2013/0141551 A1 | 6/2013 | Kim | |
| 2014/0046661 A1* | 2/2014 | Bruner | H04N 21/6582 704/235 |
| 2014/0242955 A1 | 8/2014 | Kang et al. | |
| 2015/0163545 A1 | 6/2015 | Freed et al. | |
| 2015/0317304 A1 | 11/2015 | An et al. | |
| 2015/0317307 A1 | 11/2015 | Mahkovec et al. | |
| 2015/0350139 A1 | 12/2015 | Speer et al. | |
| 2016/0098850 A1 | 4/2016 | Shintani et al. | |
| 2016/0191958 A1* | 6/2016 | Nauseef | G06V 40/20 725/116 |
| 2016/0198214 A1 | 7/2016 | Levy et al. | |
| 2016/0294714 A1 | 10/2016 | Persson et al. | |
| 2017/0006248 A1 | 1/2017 | An et al. | |
| 2017/0111670 A1 | 4/2017 | Ducloux et al. | |
| 2017/0132828 A1* | 5/2017 | Zelenin | A63F 13/63 |
| 2018/0063325 A1* | 3/2018 | Wilcox | H04M 3/42391 |
| 2018/0075659 A1 | 3/2018 | Browy et al. | |
| 2019/0052473 A1 | 2/2019 | Soni et al. | |
| 2019/0096407 A1 | 3/2019 | Lambourne et al. | |
| 2019/0213401 A1* | 7/2019 | Kuang | G10L 17/26 |
| 2019/0251344 A1 | 8/2019 | Menefee et al. | |
| 2020/0294525 A1* | 9/2020 | Santos | G10L 15/26 |
| 2021/0241309 A1* | 8/2021 | Wolf, Jr. | G06N 5/04 |
| 2021/0352380 A1* | 11/2021 | Duncan | H04N 21/4852 |
| 2022/0141547 A1* | 5/2022 | Plunkett, Jr. | G06V 20/48 725/139 |
| 2022/0171960 A1* | 6/2022 | Nelson | A63F 13/87 |
| 2022/0327309 A1* | 10/2022 | Carlock | G06F 40/47 |
| 2022/0335971 A1 | 10/2022 | Gruszka et al. | |
| 2022/0343576 A1* | 10/2022 | Marey | G10L 21/10 |

OTHER PUBLICATIONS

"Guidelines for positioning of sign language interpreters in conference, including web-streaming" Sign Language Network, Dec. 21, 2015, pp. 1-6.
"Sign Language Video Encoding for Digital Cinema" ISDCF Document 13, Jul. 18, 2018, pp. 1-6.
International Search Report & Written Opinion for International Application PCT/US2022/027717, dated Jul. 15, 2022.
International Search Report & Written Opinion for International Application PCT/US2022/027716, dated Jul. 13, 2022.
International Search Report & Written Opinion for International Application PCT/US2022/027719, dated Jul. 15, 2022.
International Search Report & Written Opinion for International Application PCT/US2022/027713, dated Aug. 9, 2022.
Daniel Jones "Demystifying Audio Watermarking, Fingerprinting and Modulation." Published Jan. 19, 2017, 10 pgs.
Tiago, Maritan U. de Arahjo, et al. "An Approach to Generate and Embed Sign Language Video Tracks Into Multimedia Contents" Information Sciences vol. 281, Oct. 10, 2014, 7 Pgs.
ISDCF Doc4-16-Channel Audio Packaging Guide obtained from https://files.isdcf.com/papers/ISDCF-Doc4-Audio-channel-recommendations.pdf (2017).
File History of U.S. Appl. No. 17/735,907, filed May 3, 2022.
File History of U.S. Appl. No. 17/735,920, filed May 3, 2022.
File History of U.S. Appl. No. 17/735,926, filed May 3, 2022.
File History of U.S. Appl. No. 17/735,935, filed May 3, 2022.

* cited by examiner

EMOTION-BASED SIGN LANGUAGE ENHANCEMENT OF CONTENT

RELATED APPLICATIONS

The present application claims the benefit of and priority to a pending Provisional Patent Application Ser. No. 63/184,692, filed on May 5, 2021, and titled "Distribution of Sign Language Enhanced Content," which is hereby incorporated fully by reference into the present application.

BACKGROUND

Members of the deaf and hearing impaired communities often rely on any of a number of signed languages for communication via hand signals. Although effective in translating the plain meaning of a communication, hand signals alone typically do not fully capture the emphasis or emotional intensity motivating that communication. Accordingly, skilled human sign language translators tend to employ multiple physical modes when communicating information. Those modes may include gestures other than hand signals, postures, and facial expressions, as well as the speed and force with which such expressive movements are executed.

For a human sign language translator, identification of the appropriate emotional intensity and emphasis to include in a signing performance may be largely intuitive, based on cognitive skills honed unconsciously as the understanding of spoken language is learned and refined through childhood and beyond. However, the exclusive reliance on human sign language translation can be expensive, and in some use cases may be inconvenient or even impracticable. Consequently, there is a need in the art for an automated solution for providing emotion-based sign language enhancement of content.

DETAILED DESCRIPTION

Figure 1:
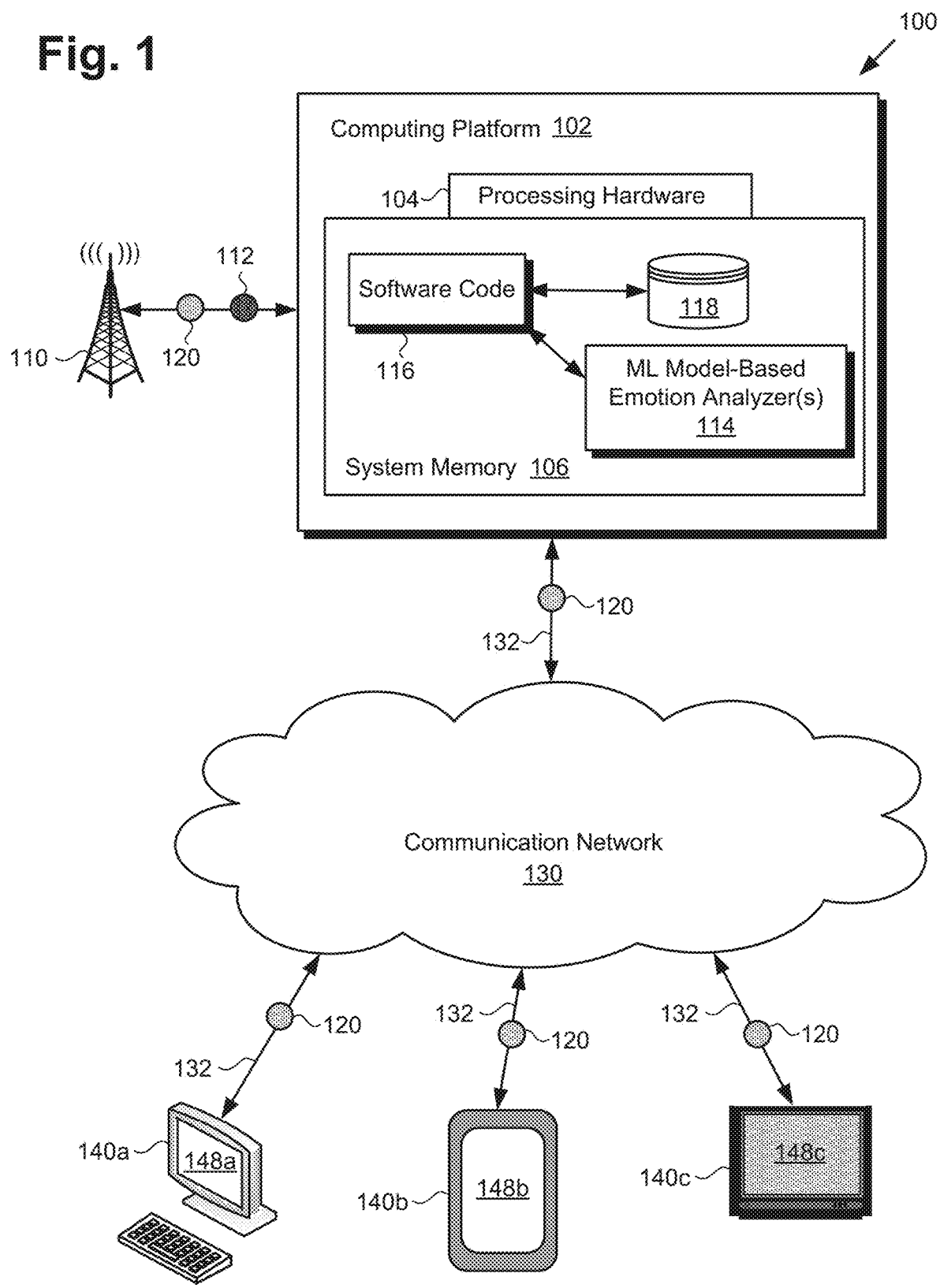
FIG. 1 shows a diagram of an exemplary system for providing emotion-based sign language enhancement of content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing emotion-based sign language enhancement of content. It is noted that although the present content enhancement solution is described below in detail by reference to the exemplary use case in which emotion-based sign language is used to enhance audio-video (A/V) content having both audio and video components, the present novel and inventive principles may be advantageously applied to video unaccompanied by audio, as well as to audio content unaccompanied by video.

It is further noted that, as defined in the present application, the expression "sign language" refers to any of a number of signed languages relied upon by the deaf community and other hearing impaired persons for communication via hand signals, facial expressions, and in some cases larger body motions or postures. Examples of sign languages within the meaning of the present application include sign languages classified as belonging to the American Sign Language (ASL) cluster, Brazilian Sign Language (LIBRAS), the French Sign Language family, Indo-Pakistani Sign Language, Chinese Sign Language, the Japanese Sign Language family, and the British, Australian, and New Zealand Sign Language (BANZSL) family, to name a few.

It is also noted that although the present content enhancement solution is described below in detail by reference to the exemplary use case in which emotion-based sign language is used to enhance content, the present novel and inventive principles may also be applied to content enhancement through the use of an entire suite of accessibility enhancements. Examples of such accessibility enhancements include assisted audio, forced narratives, subtitles, and captioning, to name a few. Moreover, in some implementations, the systems and methods disclosed by the present application may be substantially or fully automated.

As used in the present application, the terms "automation," "automated", and "automating" refer to systems and processes that do not require the participation of a human analyst or editor. Although, in some implementations, a human system administrator may sample or otherwise review the emotion-based sign language enhanced content provided by the automated systems and according to the automated methods described herein, that human involvement is optional. Thus, the methods described in the present application may be performed under the control of hardware processing components of the disclosed automated systems.

FIG. 1 shows an exemplary system for providing emotion-based sign language enhancement of content, according to one implementation. As shown in FIG. 1, content enhancement system 100 includes computing platform 102 having processing hardware 104 and system memory 106 implemented as a computer-readable non-transitory storage medium. According to the present exemplary implementation, system memory 106 stores software code 116, one or more machine learning (ML) model-based emotion analyzers 114 (hereinafter "ML model-based emotion analyzer(s) 114"), and character profile database 118.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to snake future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing, audio processing, or natural-language processing.

As further shown in FIG. 1, content enhancement system 100 is implemented within a use environment including content broadcast source 110 providing A/V content 112 to content enhancement system 100 and receiving emotion-based sign language enhanced A/V content 120 corresponding to A/V content 112 from content enhancement system 100. As depicted in FIG. 1, in some use cases, content broadcast source 110 may find it advantageous or desirable to make A/V content 112 available via an alternative distribution channel, such as communication network 130, which may take the form of a packet-switched network, for example, such as the Internet. For instance, content enhancement system 100 may be utilized by content broadcast source 110 to distribute emotion-based sign language enhanced A/V content 120 including A/V content 112 as part of a content stream, which may be an Internet Protocol (IP) content stream provided by a streaming service, or a video-on-demand (VOD) service.

The use environment also includes user systems 140a, 140b, and 140c (hereinafter "user systems 140a-140c") receiving emotion-based sign language enhanced A/V content 120 from content enhancement system 100 via communication network 130. Also shown in FIG. 1 are network communication links 132 of communication network 130 interactively connecting content enhancement system 100 with user systems 140a-140c, and displays 148a, 148b, and 148c (hereinafter "displays 148a-148c") of respective user systems 140a-140c. As discussed in greater detail below, emotion-based sign language enhanced A/V content 120 includes A/V content 112 as well as imagery depicting an emotion-based sign language translation of A/V content 112 for display on one or more of displays 148a-148c.

Although the present application refers to software code 116, ML model-based emotion analyzer(s) 114, and character profile database 118 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102 or to respective processing hardware of user systems 140a-140c. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

It is further noted that although FIG. 1 depicts software code 116, ML model-based emotion analyzer(s) 114, and character profile database 118 as being mutually co-located in system memory 106 that representation is also merely provided as an aid to conceptual clarity. More generally, content enhancement system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within content enhancement system 100. Thus, it is to be understood that software code 116, ML model-based emotion analyzer(s) 114, and character profile database 118 may be stored remotely from one another within the distributed memory resources of content enhancement system 100. It is also noted that, in some implementations, ML model-based emotion analyzer(s) 114 may take the form of a software module included in software code 116.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 116, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example, Alternatively, computing platform 102 may correspond to one or more computer servers supporting a private wide area network (WAN), local area network (LAN), or included in another type of limited distribution or private network. In addition, or alternatively, in some implementations, content enhancement system 100 may utilize a local area broadcast method, such as User Datagram Protocol (UDP) or Bluetooth, for example. Furthermore, in some implementations, content enhancement system 100 may be implemented virtually, such as in a data center. For example, in some implementations, content enhancement system 100 may be implemented in software, or as virtual machines.

It is also noted that, although user systems 140a-140c are shown variously as desktop computer 140a, smartphone 140h, and smart television (small TV) 140c, in FIG. 1, those representations are provided merely by way of example. In other implementations, user systems 140a-140c may take the form of any suitable mobile or stationary computing devices or systems that implement data processing capabilities sufficient to provide a user interface, support connections to communication network 130, and implement the functionality ascribed to user systems 140a-140c herein. That is to say, in other implementations, one or more of user systems 140a-140c may take the form of a laptop computer, tablet computer, digital media player, game console, or a wearable communication device such as a smartwatch, to name a few examples. Displays 148a-148c may take the form of liquid crystal displays (LCDs), light-emitting diode (LED) displays, organic light-emitting diode (OLED) displays, quantum dot (QD) displays, or any other suitable display screens that perform a physical transformation of signals to light.

In one implementation, content broadcast source 110 may be a media entity providing A/V content 112. A/V content 112 may include A/V content from a linear TV program stream, for example, that includes a high-definition (HD) or ultra-HD (UHD) baseband video signal with embedded audio, captions, time code, and other ancillary metadata, such as ratings and/or parental guidelines. In some implementations, A/V content 112 may also include multiple audio tracks, and may utilize secondary audio programming (SAP) and/or Descriptive Video Service (DVS), for example. Alternatively, in some implementations, A/V content 112 may be video game content, movie content, or music video content, to name a few examples.

A/V content 112 may include the same source video that is broadcast to a traditional TV audience. Thus, content broadcast source 110 may take the form of a conventional cable and/or satellite TV network, for example. As noted above, content broadcast source 110 may find it advantageous or desirable to make A/V content 112 available via an alternative distribution channel, such as communication network 130, which may take the form of a packet-switched network, for example, such as the Internet, as also noted above. For instance, content enhancement system 100 may be utilized by content broadcast source 110 to distribute emotion-based sign language enhanced A/V content 120 including A/V content 112 as part of a content stream, which may be an IP content stream provided by a streaming service, or a VOD service. Alternatively, or in addition, although not depicted in FIG. 1, in some use cases emotion-based sign language enhanced A/V content 120 may be distributed on a physical medium, such as a DVD, Blu-ray Disc®, or FLASH drive, for example.

Figure 2:
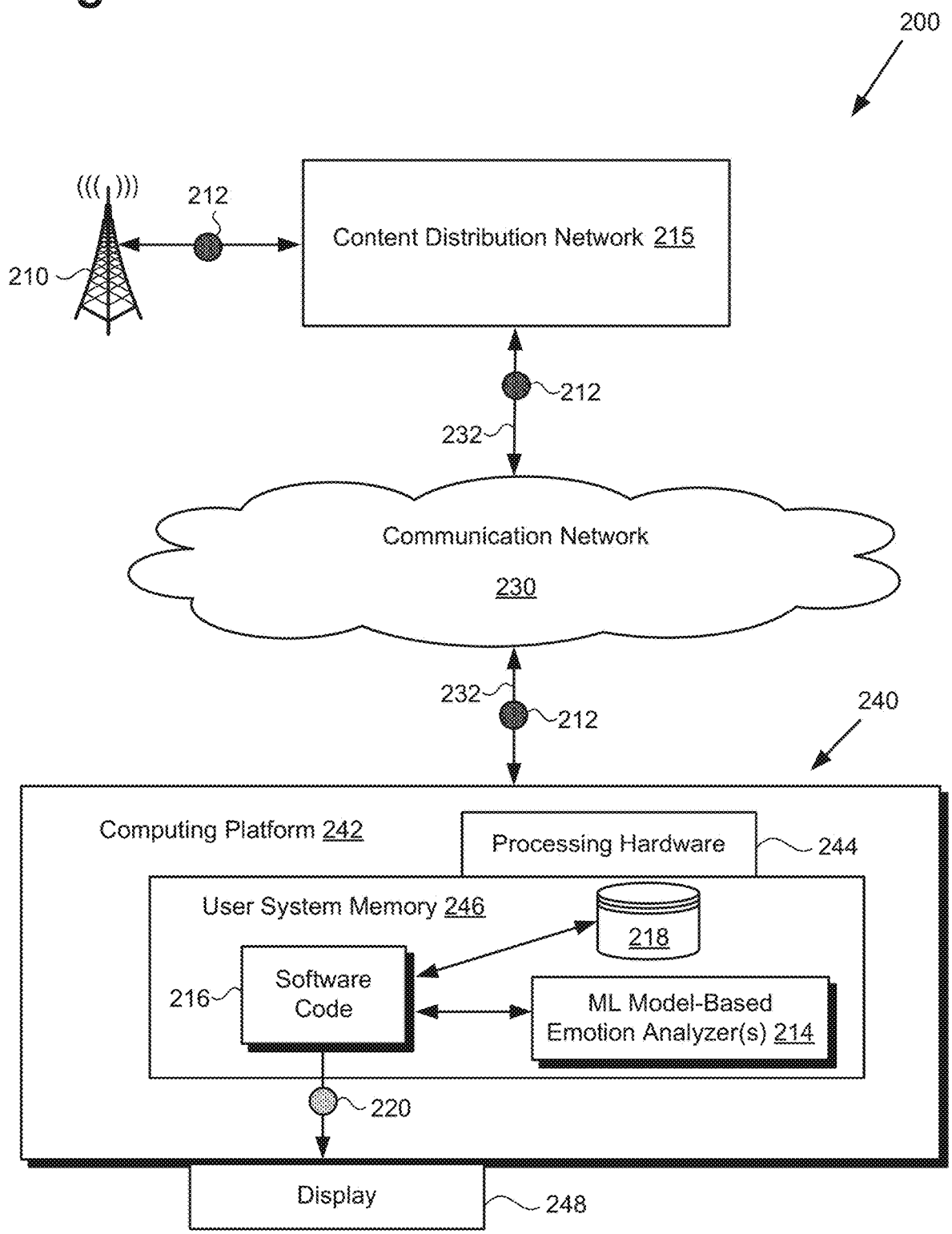
FIG. 2 shows a diagram of another exemplary implementation of a system for providing emotion-based sign language enhancement of content.

FIG. 2 shows another exemplary system, i.e., user system 240, for providing emotion-based sign language enhanced A/V content, according to one implementation. As shown in FIG. 2, user system 240 includes user system computing platform 242 having processing hardware 244, user system memory 246 implemented as a computer-readable non-transitory storage medium storing software code 216, one or more ML model-based emotion analyzers 214 (hereinafter "ML model-based emotion analyzer(s) 214"), and character profile database 218. User system 240 also includes display 248, which may be physically integrated with user system 240 or may be communicatively coupled to but physically separate from user system 240. For example, where user system 240 is implemented as a smartphone, laptop computer, or tablet computer, display 248 will typically be integrated with user system 240. By contrast, where user system 240 is implemented as a desktop computer, display 248 may take the form of a monitor separate from user system computing platform 242 in the form of a computer tower.

As further shown in FIG. 2, user system 240 is utilized in use environment 200 including content broadcast source 210 providing A/V content 212 to content distribution network 215, which in turn distributes A/V content 212 to user system 240 via communication network 230 and network communication links 232. According to the implementation shown in FIG. 2, software code 216 stored in user system memory 246 of user system 240 is configured to receive A/V content 212 and to output emotion-based sign language enhanced A/V content 220 including A/V content 212 for display on user system display 248.

Content broadcast source 210, A/V content 212, emotion-based sign language enhanced A/V content 220, communication network 230, and network communication links 232 correspond respectively in general to content broadcast source 110, A/V content 112, emotion-based sign language enhanced A/V content 120, communication network 130, and network communication links 132, in FIG. 1. In other words, content broadcast source 210, A/V content 212, emotion-based sign language enhanced A/V content 220, communication network 230, and network communication links 232 may share any of the characteristics attributed to respective content broadcast source 110, A/V content 112, emotion-based sign language enhanced A/V content 120, communication network 130, and network communication links 132 by the present disclosure, and vice versa.

User system 240 and display 248 correspond respectively in general to any or all of user systems 140a-140c and respective displays 148a-148c in FIG. 1. Thus, user systems 140a-140c and displays 148a-148c may share any of the characteristics attributed to respective user system 240 and display 248 by the present disclosure, and vice versa. That is to say, like displays 148a-148c, display 248 may take the form of an LCD, LED display, OLED display, or QD display, for example. Moreover, although not shown in FIG. 1, each of user systems 140a-140c may include features corresponding respectively to user system computing platform 242, processing hardware 244, and user system memory 246 storing software code 216, ML model-based emotion analyzer(s) 214, and character profile database 218.

User system processing hardware 244 may include multiple hardware processing units, such as one or more CPUs, one or more GPUs, one or more TPUs, and one or more FPGAs, for example, as those features are defined above.

Software code 216, ML model-based emotion analyzer(s) 214, and character profile database 218 correspond respectively in general to software code 116, ML model-based emotion analyzer(s) 114, and character profile database 118, in FIG. 1. Consequently, software code 216, ML model-based emotion analyzer(s) 214, and character profile database 218 may share any of the characteristics attributed to respective software code 116, ML model-based emotion analyzer(s) 114, and character profile database 118 by the present disclosure, and vice versa. That is to say, software code 216 and ML model-based emotion analyzer(s) 214 are capable of performing all of the operations attributed software code 116 and ML model-based emotion analyzer(s) 114 by the present disclosure. Thus, in implementations in which client processing hardware 244 executes software code 216 and ML model-based emotion analyzer(s) 214 stored locally in user system memory 246, user system 240 may perform any of the actions attributed to content enhancement system 100 by the present disclosure. In other words, in some implementations, software code 216 executed by processing hardware 244 of user system 240 may receive A/V content 212 and may utilize ML model-based emotion analyzer(s) 214 to output emotion-based sign language enhanced content 220 including A/V content 212 as well as an emotion-based sign language translation of A/V content 212.

Figure 3A:
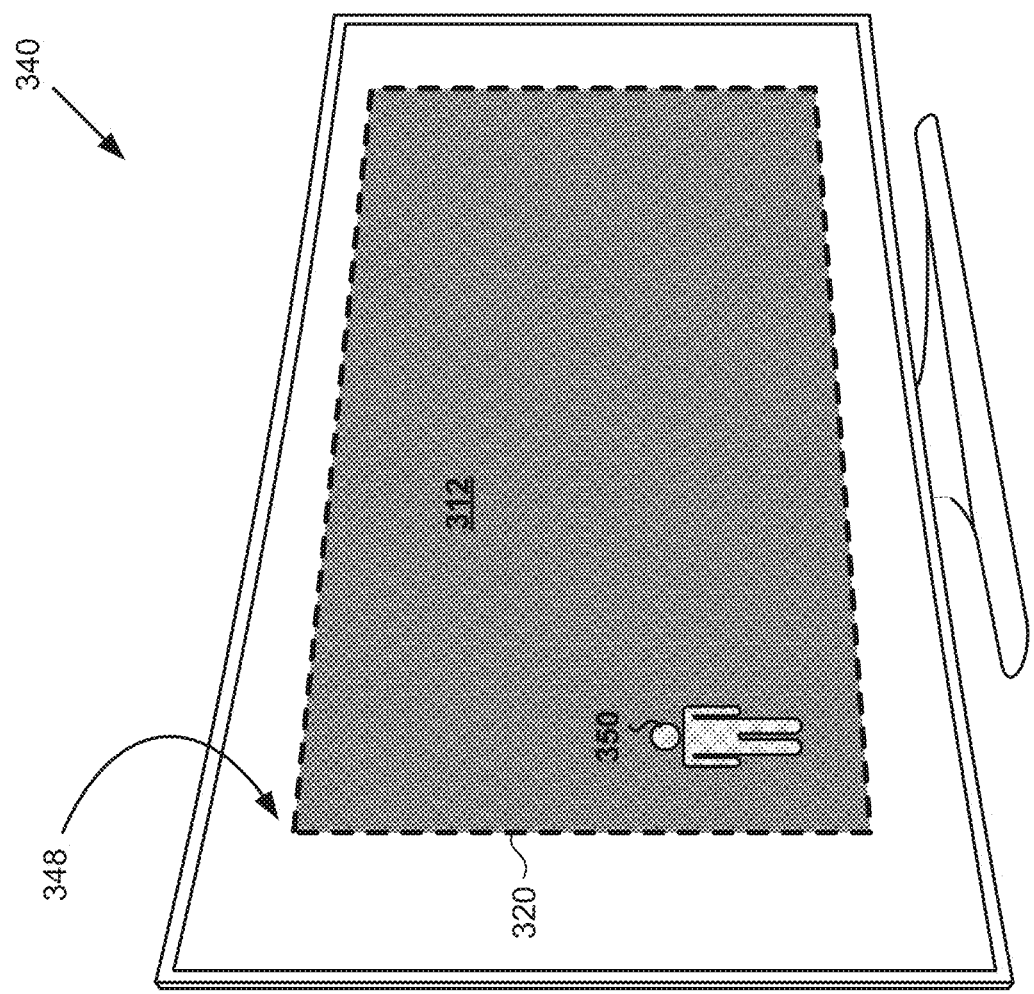
FIG. 3A shows an exemplary implementation in which a performance of an emotion-based sign language translation of content is provided to viewers of that content.

FIG. 3A shows exemplary display 348 of user system 340 for use in providing emotion-based sign language enhanced A/V content 320. As shown in FIG. 3A, emotion-based sign language enhanced A/V content 320 includes A/V content 312 and emotion-based sign language translation 350 of A/V content 312, shown as an overlay of A/V content 312 on display 348. User system 340, display 348, A/V content 312, and emotion-based sign language enhanced A/V content 320 correspond respectively in general to user system(s) 140a-140c/240, display(s) 148a-148c/248, A/V content 112/212, and emotion-based sign language enhanced A/V content 120/220 in FIGS. 1 and 2. As a result, user system 340, display 348, A/V content 312, and emotion-based sign language enhanced A/V content 320 may share any of the characteristics attributed to respective user system(s) 140a-140c/240, display(s) 148a-148c/248, A/V content 112/212, and emotion-based sign language enhanced A/V content 120/220 by the present disclosure, and vice versa. That is to say, like display(s) 148a-148c/248, display 348 may take the form of an LCD, LED display, OLED display, QD display, or any other suitable display screen that performs a physical transformation of signals to light. In addition, although not shown in FIG. 3A, user system 340 may include features corresponding respectively to user system computing platform 242, processing hardware 244, and system memory storing software code 216, ML model-based emotion analyzer(s) 214, and character profile database 218, in FIG. 2.

It is noted that although emotion-based sign language translation 350 of A/V content 312, is shown as an overlay of A/V content 312, in FIG. 3A, that representation is merely exemplary. In other implementations, the display dimensions of A/V content 312 may be reduced so as to allow emotion-based sign language translation 350 of A/V to be rendered next to A/V content 312, e.g., above, below, or laterally adjacent to A/V content 312. Alternatively, in some implementations, emotion-based sign language translation 350 of A/V content 312 may be projected or otherwise displayed on a surface other than display 348, such as a projection screen or wall behind or next to user system 340, for example.

Emotion-based sign language translation 350 of A/V content 112/212/312 may be executed or performed (hereinafter "performed") by a computer generated digital character (hereinafter "animated character"). For example, software code 116/216 may be configured to programmatically interpret one or more of visual images, audio, a script, captions, or subtitles, or metadata of A/V content 112/212/312 into sign language hand signals, as well as other gestures, postures, and facial expressions conveying one or more emotional aspects of A/V content 112/212/312, and to perform that interpretation using the animated character. It is noted that background music with lyrics can be distinguished from lyrics being sung by a character using facial recognition, object recognition, activity recognition, or any combination of those technologies. It is further noted that ML model-based emotion analyzer(s) 114/214 may be configured to predict appropriate facial expressions and postures for execution by the animated character during performance of emotion-based sign language translation 350, as well as to predict the speed and forcefulness or emphasis with which the animated character executes the performance of emotion-based sign language translation 350.

Referring to FIGS. 1 and 3A in combination, in some implementations, processing hardware 104 of computing platform 102 may execute software code 116 to synchronize emotion-based sign language translation 350 with a timecode of A/V content 112/312 when producing emotion-based sign language enhanced A/V content 120/320, and to record emotion-based sign language enhanced A/V content 120/320, or to broadcast or stream emotion-based sign language enhanced A/V content 120/320 to user system 340. In some of those implementations, the performance of emotion-based sign language translation 350 by the animated character may be pre-rendered by content enhancement system 100 and broadcasted or streamed to user system 340. However, in other implementations in which emotion-based enhanced A/V content 120/320 including A/V content 112/312 and emotion-based sign language translation 350 are broadcasted or streamed to user system 340, processing hardware 104 may execute software code 116 to generate emotion-based sign language translation 350 dynamically during the recording, broadcasting, or streaming of A/V content 112/312.

Further referring to FIG. 2, in yet other implementations in which A/V content 112/212/312 is broadcasted or streamed to user system 240/340, processing hardware 244 of user system 240/340 may execute software code 216 to generate emotion-based sign language translation 350 locally on user system 240/340, and to do so dynamically during playout of AV content 112/212/312. Processing hardware 244 of user system 240/340 may further execute software code 216 to render the performance of emotion-based sign language translation 350 by the animated character on display 248/348 concurrently with rendering A/V content 112/312 corresponding to emotion-based sign language translation 350.

In some implementations, the pre-rendered performance of emotion-based sign language translation 350 by an animated character, or facial points and other digital character landmarks for performing emotion-based sign language translation 350 dynamically using the animated character may be transmitted to user system(s) 140a-140c/240/340 using a separate communication channel than that used to send and receive A/V content 112/212/312. In one such implementation, the data for use in performing emotion-based sign language translation 350 may be generated by software code 116 on content enhancement system 100, and may be transmitted to 140a-140c/240/340. In other implementations, the data for use in performing emotion-based sign language translation 350 may be generated locally on user system 240/340 by software code 216, executed by processing hardware 244.

In some implementations, it may be advantageous or desirable to enable a user of user system 140a-140c/240/340 to affirmatively select a particular animated character to perform emotion-based sign language translation 350 from a predetermined cast of selectable animated characters. In those implementations, a child user could select an age appropriate animated character different from an animated character selected by an adult user. Alternatively, or in addition, the cast of selectable animated characters may vary depending on the subject matter of A/V content 112/212/312. For instance, where A/V content 112/212/312 portrays a sporting event, the selectable or default animated characters for performing emotion-based sign language translation 350 may depict athletes, while actors or fictional characters may be depicted by emotion-based sign language translation 350 when A/V content 112/212/312 is a movie or episodic TV content.

Figure 3B:
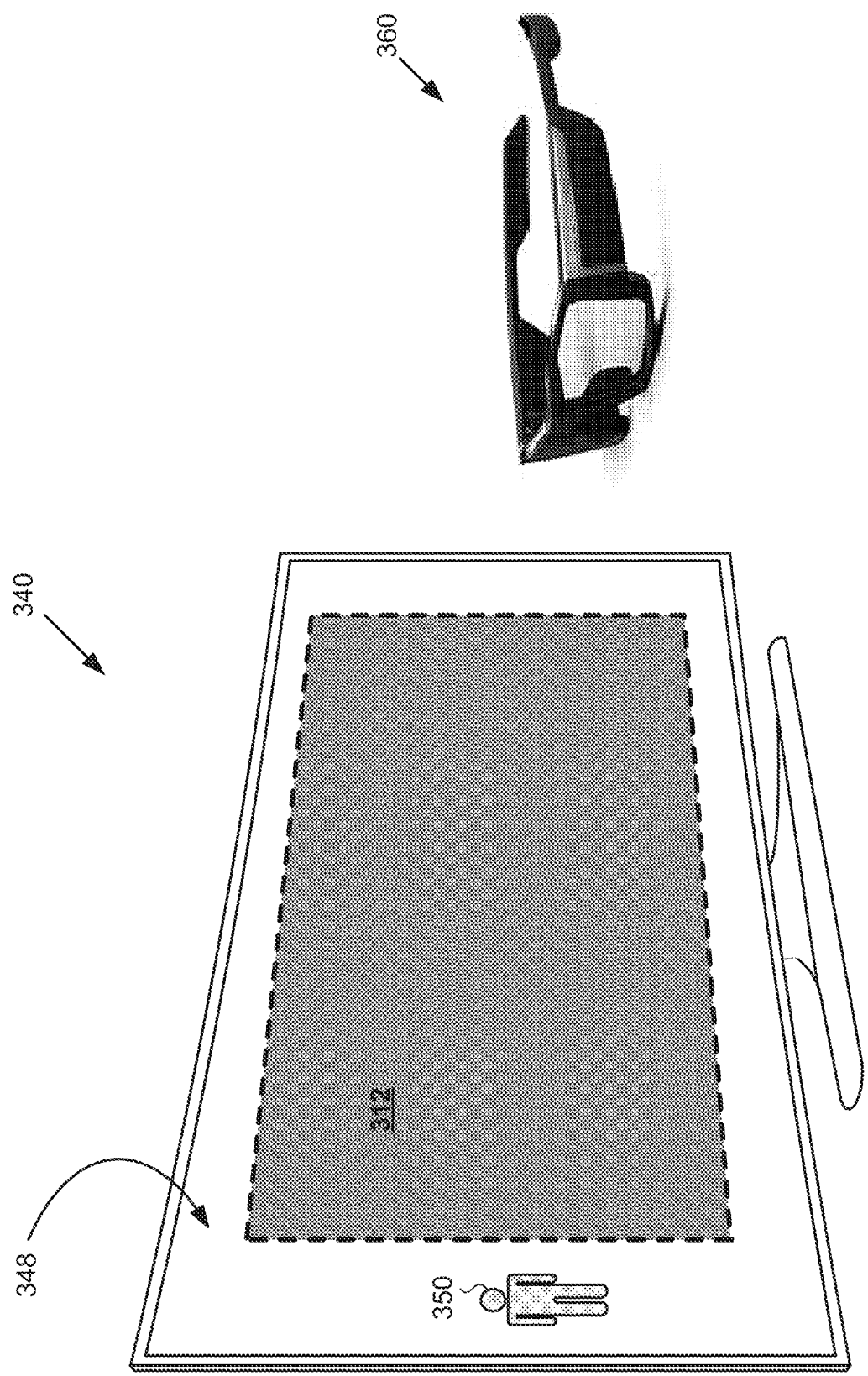
FIG. 3B shows an exemplary implementation in which a performance of an emotion-based sign language translation of content is provided to one or more, but less than all viewers of the content.

According to the exemplary implementation shown in FIG. 3A, emotion-based sign language translation 350 is rendered on display 348 of user system 340 and is thus visible to all users of user system 340 concurrently. However, in some use cases it may be advantageous or desirable to make emotion-based sign language translation 350 visible to one or more, but less than all of the users of user system 340. FIG. 3B shows such an implementation, according to one example. In addition to the features shown in FIG. 3A, FIG. 3B includes an augmented reality (AR) wearable device in the form of AR glasses 360 for use by a user of user system 340. However, it is noted that more generally, AR glasses 360 may correspond to any AR viewing device. In the implementation shown in FIG. 3B, emotion-based sign language translation 350 is rendered on AR glasses 360 as an overlay on A/V content 312 rendered on display 348 (similar to the illustration in FIG. 3A), or outside of A/V content 312, such as beside A/V content 312 (as illustrated in FIG. 3B), for example.

In some implementations, the performance of emotion-based sign language translation 350 by an animated character, or facial points and other digital character landmarks for performing emotion-based sign language translation 350 dynamically using the animated character may be transmitted to AR glasses 360 using a separate communication channel than that used to send and receive A/V content 312. In one such implementation, the data for use in performing emotion-based sign language translation 350 may be generated by software code 116 on content enhancement system 100, and may be transmitted to AR glasses wirelessly, such as via a fourth generation of broadband cellular technology (4G) wireless channel, or 5G wireless channel. In other implementations, the data for use in performing emotion-based sign language translation 350 may be generated locally on user system 340 by software code 216, executed by processing hardware 244, and may be transmitted to AR glasses 360 via one or more of WiFi, Bluetooth, ZigBee, and 60 GHz wireless communications methods.

The implementation shown in FIG. 3B enables one or r tore users of user system 340 to receive emotion-based sign language translation 350 while advantageously rendering emotion-based sign language translation 350 undetectable to other users. Alternatively, or in addition, in implementations in which emotion-based sign language translation 350 is performed by an animated character, the implementation shown in FIG. 3B advantageously may enable different users to select different animated characters to perform emotion-based sign language translation 350. In some implementations, for example, a user of AR glasses 360 may select from among pre-rendered performances of emotion-based sign language translation 350 by different animated characters. In those implementations, the user selected performance may be transmitted to AR glasses 360 by content enhancement system 100 or user system 340. Alternatively, in some implementations, content enhancement system 100 or user system 340 may render a user selected performance dynamically and in real-time with respect to playout of A/V content 312, and may output that render to AR glasses 360. In yet other implementations, AR glasses 360 may be configured to render the performance of emotion-based sign language translation 350 dynamically, using facial points and other digital character landmarks for animating emotion-based sign language translation 350 received from content enhancement system 100 or user system 340.

Figure 3C:
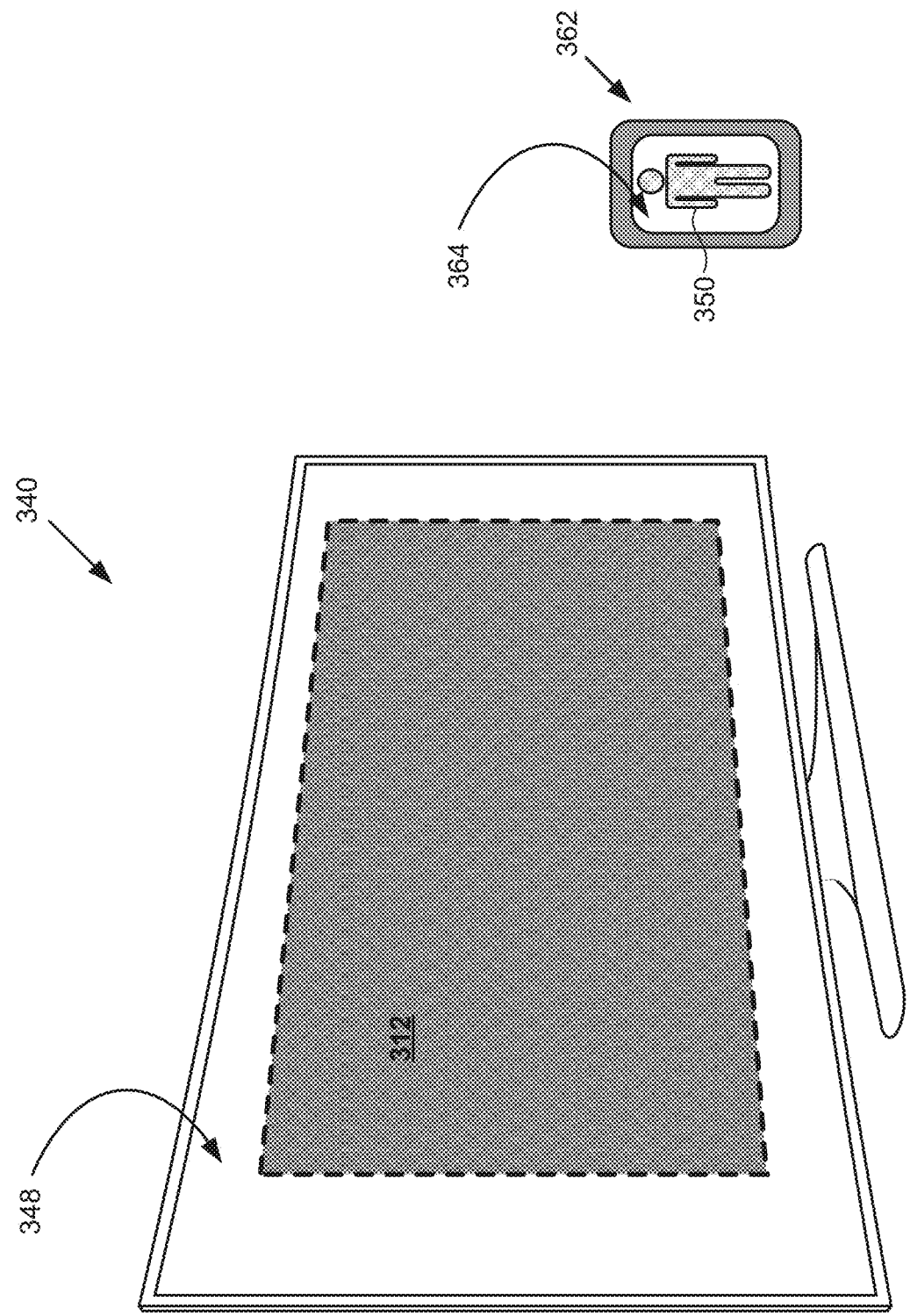
FIG. 3C shows another exemplary implementation in which a performance of an emotion-based sign language translation of content is provided to one or more, but less than all viewers of the content.

FIG. 3C shows another exemplary implementation in which emotion-based sign language translation 350 is visible to one or more, but less than all of the users of user system 340. In addition to the features shown in FIG. 3A, FIG. 3C includes personal communication device 362 including display 364 providing a second display screen for use by a user of user system 340. In the implementation shown in FIG. 3C, emotion-based sign language translation 350 is rendered on display 364 of personal communication device 362 and is synchronized with playout of A/V content 312 on display 348 of user system 340. Synchronization of emotion-based sign language translation 350 with playout of A/V content 312 may be performed periodically, using predetermined time intervals between synchronizations, or may be performed substantially continuously.

Personal communication device 362. may take the form of a smartphone, tablet computer, game console, smartwatch, or other wearable or otherwise smart device, to name a few examples. Display 364 providing the second display screen for a user of user system 340 may be implemented as an LCD, LED display, OLED, display, QD display, or any other suitable display screen that performs a physical transformation of signals to light.

In some implementations, facial points and other digital character landmarks for performing emotion-based sign language translation 350 dynamically using the animated character may be transmitted to personal communication device 362 using a separate communication channel than that used to send and receive A/V content 312. In one such implementation, the data for use in performing emotion-based sign language translation 350 may be generated by software code 116 on content enhancement system 100, and may be transmitted to personal communication device 362 wirelessly, such as via a 4G or 5G wireless channel. In other implementations, the data for use in performing emotion-based sign language translation 350 may be generated locally on user system 340 by software code 216, executed by processing hardware 244, and may be transmitted to personal communication device 362 via one or more of WiFi, Bluetooth, ZigBee, and 60 GHz wireless communications methods.

As in FIG. 3B, the implementation shown in FIG. 3C enables one or more users of user system 340 to receive emotion-based sign language translation 350 while advantageously rendering emotion-based sign language translation 350 undetectable to other users. Alternatively, or in addition, in implementations in which emotion-based sign language translation 350 is performed by an animated character, the implementation shown in FIG. 3C advantageously may enable different users to select different animated characters to perform emotion-based sign language translation 350. In some implementations, for example, a user of personal communication device 362 may select from among pre-rendered performances of emotion-based sign language translation 350 by different animated characters. In those implementations, the user selected performance may be transmitted to personal communication device 362 by content enhancement system 100 or user system 340. Alternatively, in some implementations, content enhancement system 100 or user system 340 may render a user selected performance dynamically and in real-time with respect to playout of A/V content 312, and may output that render to personal communication device 362. In yet other implementations, personal communication device 362 may be configured to render the performance of emotion-based sign language translation 350 dynamically, using facial points and other digital character landmarks for performing emotion-based sign language translation 350 received from content enhancement system 100 or user system 340.

In addition to the exemplary implementations shown in FIGS. 1, 2, 3A, 3B, and 3C, in some implementations, emotion-based sign language translation 350 may be rendered for some or all users of user system 140a-140c/240/ 340 using a lenticular projection technique in which dual video feeds are generated, one presenting A/V content 112/212/312 and the other presenting emotion-based sign language translation 350. In some implementations employing such a lenticular technique, emotion-based sign language translation 350 may be visible to all users of user system 140a-140c/240/340, while in other implementations, customized eyewear could be used to render emotion-based sign language translation 350 visible only to those users utilizing the customized eyewear.

Figure 4:
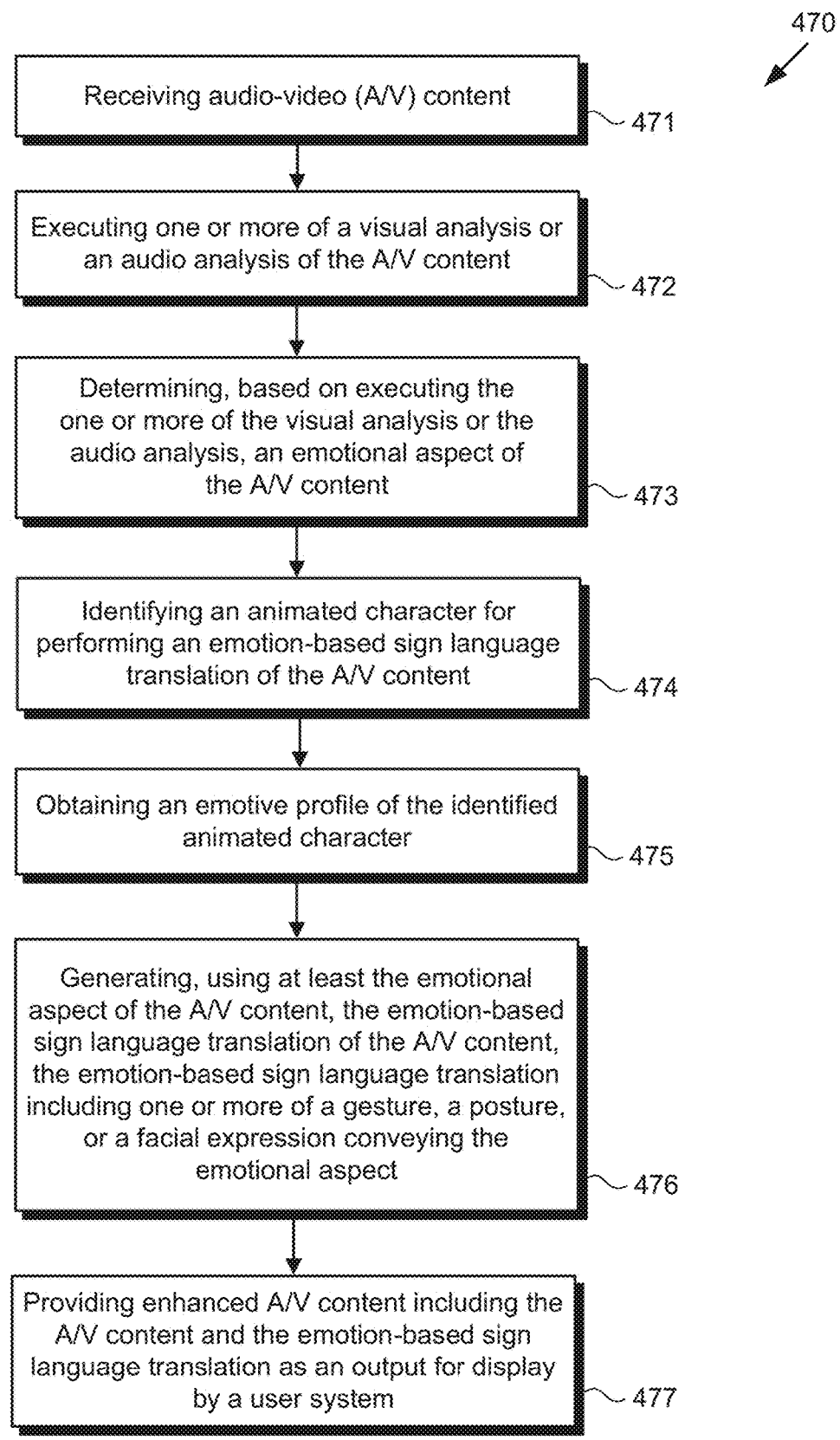
FIG. 4 shows a flowchart outlining an exemplary method for providing emotion-based sign language enhancement of content, according to one implementation.

The functionality of content enhancement system 100, user system 240, and software code 116/216 in FIGS. 1 and 2 will be further described by reference to FIGS. 4 and 5. FIG. 4 shows flowchart 470 presenting an exemplary method for providing emotion-based sign language enhancement of content, according to one implementation. With respect to the method outlined in FIG. 4, it is noted that certain details and features have been left out of flowchart 470 in order not to obscure the discussion of the inventive features in the present application.

Figure 5:
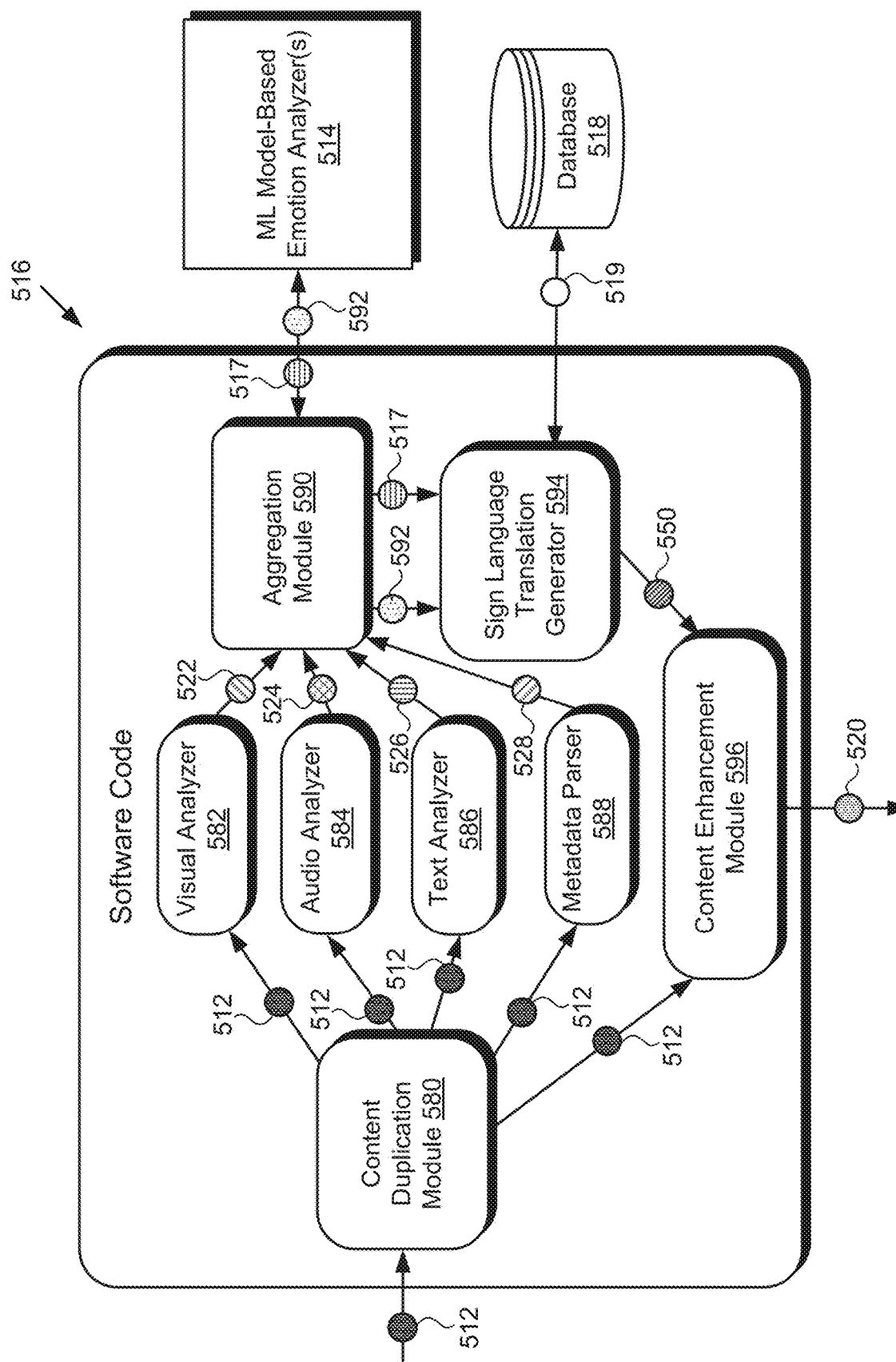
FIG. 5 shows a diagram of an exemplary software code suitable for use by the systems shown in FIGS. 1 and 2, according to one implementation.

FIG. 5 shows an exemplary diagram of software code 516 suitable for execution by content enhancement system 100 and user system 200, according to one implementation. As shown in FIG. 5, software code 516 is communicatively coupled to one or more ML model-based emotion analyzers 514 (hereinafter "ML model-based emotion analyzer(s) 514"), as well as to character profile database 518, and may include content duplication module 580, visual analyzer 582, audio analyzer 584, text analyzer 586, metadata parser 588, aggregation module 590, sign language translation generator 594, and content enhancement module 596. In addition, FIG. 5 shows A/V content 512, visual analysis data 522, audio analysis data 524, text analysis data 526, metadata 528, aggregated content analysis data 592, emotional aspect 517 of A/V content 512, emotive profile 519, emotion-based sign language translation 550, and emotion-based sign language enhanced A/V content 520.

Emotion-based sign language translation 550 corresponds in general to emotion-based sign language translation 350 in FIGS. 3A, 3B, and 3C. As a result, emotion-based sign language translation 550 may share any of the characteristics attributed to emotion-based sign language translation 350 by the present disclosure, and vice versa. In addition, A/V content 512 and emotion-based sign language enhanced A/V content 520 correspond respectively in general to A/V content 112/212/312 and emotion-based sign language enhanced A/V content 120/220/320, in FIGS. 1, 2, and 3A. Consequently, A/V content 512 and emotion-based sign language enhanced A/V content 520 may share any of the characteristics attributed to respective A/V content 112/212/ 312 and emotion-based sign language enhanced A/V content 120/220/320 by the present disclosure, and vice versa.

Moreover, software code 516, ML, model-based emotion analyzer(s) 514, and character profile database 518 correspond respectfully in general to software code 116/216, ML model-based emotion analyzer(s) 114/214, and character profile database 118/218, in FIGS. 1 and 2. Thus, software code 116/216, ML model-based emotion analyzer(s) 114/ 214, and character profile database 118/218 may share any of the characteristics attributed to respective software code 516, ML model-based emotion analyzer(s) 514, and character profile database 518 by the present disclosure, and vice versa. That is to say, like software code 516, software code 116/216 may include features corresponding respectively to content duplication module 580, visual analyzer 582, audio analyzer 584, text analyzer 586, metadata parser 588, aggregation module 590, sign language translation generator 594, and content enhancement module 596.

Referring to FIG. 4 in combination with FIGS. 1, 2, and 5, flowchart 470 begins with receiving A/V content 112/212/ 512 (action 471). As noted above, A/V content 112/212/512 may include content in the form of video games, music videos, animation, movies, or episodic TV content that includes episodes of TV shows that are broadcasted, streamed, or otherwise available for download or purchase on the Internet or via a user application.

As shown in FIG. 1, in some implementations, A/V content 112 may be received by content enhancement system 100 from broadcast source 110. Referring to FIGS. 1 and 5 in combination, in those implementations, A/V content 112/512 may be received by content enhancement software code 116/516, executed by processing hardware 104 of computing platform 102. As shown in FIG. 2, in other implementations, A/V content 212 may be received by user system 240 from content distribution network 215 via communication network 230 and network communication links 232. Referring to FIGS. 2 and 5 in combination, in those implementations, A/V content 212/512 may be received by content enhancement software code 216/516, executed by processing hardware 244 of user system computing platform 242.

Flowchart 470 further includes executing at least one of a visual analysis or an audio analysis of A/V content 112/212/ 512 (action 472). For example, processing hardware 104 may execute software code 116/516, or processing hardware 244 may execute software code 216/516 to utilize visual analyzer 582, audio analyzer 584, or visual analyzer 582 and audio analyzer to execute the analysis of A/V content 112/212/512. In implementations in which both a visual analysis and an audio analysis of A/V content 112/212/512 are executed, processing hardware 104 may execute software code 116/516, or processing hardware 244 may execute software code 216/516 to use content duplication module 580 to produce one or more copies of A/V content 112/212/512, thereby advantageously enabling the execution of the visual analysis and the audio analysis in parallel, i.e., substantially concurrently.

In various implementations, visual analyzer 582 may be configured to apply computer vision or other AI techniques to A/V content 112/212/512, or may be implemented as an NN or other type of machine. learning model. Visual analyzer 582 may be configured or trained to recognize what characters are speaking, as well as the emotional intensity of their delivery. In particular, visual analyzer 582 may be configured or trained to identify humans, characters, or other talking animated objects, and identify emotions or strength of conveyance. lip various use cases, different implementations of visual analyzer 582 may be used for different types of broadcasts (i.e., specific configuration or training for specific content). For example, for a news broadcast, visual analyzer 582 may be configured or trained to identify spec TV anchors and their characteristics, or salient regions of frames within A/V content for visual analyzer 582 to focus on may be specified, such as regions in which the TV anchor usually is seated.

Audio analyzer 584 may also be implemented as an NN or other machine learning model. As noted above, visual analyzer 582 and audio analyzer 584 may be used in combination to analyze A/V content 112/212/512. For instance, in analyzing a football game or other sporting event, audio analyzer 584 can be configured or trained to listen to the audio track of the event, and its analysis may be verified using visual analyzer 582, or visual analyzer 582 may interpret the video of the event, and its analysis may be verified using audio analyzer 584. It is noted that A/V content 112/212/512 will typically include multiple video frames and multiple audio frames. In some of those use cases, processing hardware 104 may execute software code 116/516, or oar processing hardware 244 Wray execute software code 216/516 to execute the visual analysis of A/V content 112/212/512, the audio analysis of A/V content 112/212/512, or both, on a frame-by-frame basis.

Flowchart 470 further includes determining, based on executing the at least one of the visual analysis or the audio analysis in action 472, emotional aspect 517 of A/V content 112/212/512 (action 473). As defined for the purposes of the present application, the expression "emotional aspect" refers to any of a number of emotion-based characteristics of A/V content 112/212/512, including but not limited to, the genre of A/V content 112/212/512, the emotional state of one or more characters depicted in A/V content 112/212/512 as manifested by facial expressions, gestures, or postures, the intensity of any such emotional state, and the emotional tone or motif of A/V content 112/212/512 as manifested by lighting effects, background imagery, or soundtrack, to name a few examples.

Determination of emotional aspect 517 of A/V content 112/2121512 in action 473 may be performed by software code 116/516 executed by processing hardware 104, or by software code 216/516 executed by processing hardware 244, and using aggregation module 590 and ML model-based emotion analyzer(s) 114/214/514. For example, aggregation module 590 may receive visual analysis data 522 from visual analyzer 582 and audio analysis data 524 from audio analyzer 584. Aggregation module may then provide aggregated content analysis data 592 to ML model-based emotion analyzer(s) 114/214/514 for inferencing of emotional aspect 517 of A/V content 112/212/512. Thus, in some implementations content enhancement system 100 or user system 240 includes ML model-based emotion analyzer(s) 114/214/514, and emotional aspect 517 of A/V content 112/212/512 is determined using ML model-based emotion analyzer(s) 114/214/514.

In some use cases, A/V content 112/212/512 may include text. In use cases in which A/V content includes text, processing hardware 104 may execute software code 116/516, or processing hardware 244 may further execute software code 216/516 to utilize text analyzer 584 to analyze A/V content 112/212/512. In implementations in which a text analysis of A/V content 112/212/512 is executed, in addition to one or both of a visual analysis and an audio analysis of A/V content 112/212/512, processing hardware 104 may execute software code 116/516, or processing hardware 244 may execute software code 216/516 to use come duplication module 580 to produce one or more copies of A/V content 112/212/512, thereby advantageously enabling the execution of the text analysis and the one or more of the visual analysis and the audio analysis in parallel, i.e., substantially concurrently.

In use cases in which a text analysis of A/V content 112/212/512 is executed, text analyzer 586 may output text analysis data 526 to aggregation module 590, and aggregation module 590 may include text analysis data 526 in aggregated content analysis data 592 provided to ML model-based emotion analyzer(s) 114/214/514. Thus, in use cases in which A/V content 112/212/512 includes text, determination of emotional aspect 517 of A/V content 112/212/512 in action 473 may further be based on analyzing that text.

It is further noted that, in some use cases, A/V content 112/212/512 may include metadata. In use cases in which A/V content includes metadata, processing hardware 104 may execute software code 116/516, or processing hardware 244 may further execute software code 216/516 to utilize metadata parser 588 to extract metadata 528 from A/V content 112/212/512. In implementations in which metadata parsing of A/V content 112/212/512 is executed, in addition to one or more of a visual analysis, an audio analysis, and a text analysis of A/V content 112/212/512, processing hardware 104 may execute software code 116/516, or processing hardware 244 may execute software code 216/516 to use content duplication module 580 to produce one or more copies of A/V content 112/212/512, thereby advantageously enabling the execution of the metadata parsing and the one or more of the visual analysis, the audio analysis, and the text analysis in parallel, i.e., substantially concurrently.

In use cases in which metadata 528 is extracted from A/V content 112/212/512, metadata parser 588 may output metadata 528 to aggregation module 590, and aggregation module 590 may include metadata 528 in aggregated content analysis data 592 provided to ML model-based emotion analyzer(s) 114/214/514. Thus, in use cases in which A/V content 112/212/512 includes metadata 528, determination of emotional aspect 517 of A/V content action 473 may further be based on analyzing metadata 528.

In some implementations, flowchart 470 may include optionally identifying an animated character for performing emotion-based sign language translation 550 (action 474). That is to say, action 474 is optional, and in some implementations may be omitted from the method outlined by flowchart 470. For example, in some implementations, content enhancement system 100 or user system 240 may be configured to provide emotion-based sign language translation 550 using a predetermined default animated character.

However, in other implementations, as noted above, it may be advantageous or desirable to enable a user of user system(s) 140a-140c/240 to affirmatively select a particular animated character to perform emotion-based sign language translation 550 from a predetermined cast of selectable animated characters. In those implementations, a child user could select an age appropriate animated character different from an animated character selected by an adult user. Alternatively, or in addition, the cast of selectable animated characters may vary depending on the subject matter of A/V content 112/212/512. For instance, and as also noted above, where A/V content 112/212/512 portrays a sporting event, the selectable or default animated characters for performing emotion-based sign language translation 350 may depict athletes, while actors or fictional characters may be depicted by emotion-based sign language translation 350 when A/V content 112/212/512 is a movie or episodic TV content.

In implementations in which the method outlined by flowchart 470 includes action 474, action 474 may be performed by software code 116/516 of content enhancement system 100, executed by processing hardware 104, or by software code 216/516 of user system 240, executed by processing hardware 244. Moreover, in some of those implementations, identification of the animated character may be based on inputs to user system 240 by a user of user system 240.

In some implementations, flowchart 470 may further include obtaining, from character profile database 118/218/518, emotive profile 519 of the animated character for performing emotion-based sign language translation 550 (action 475). Thus, like action 474, action 475 is optional and in some implementations may be omitted from the method outlined by flowchart 470. With respect to the feature identified as emotive profile 519, it is noted that as defined for the purposes of the present application, the expression "emotive profile" refers to the characteristic or even idiosyncratic manner in which a persona associated with a particular animated character typically uses facial expressions, gestures, postures, and emotional emphasis when communicating. For example, while an animated character having an excitable emotive profile may use one or more of exaggerated facial expressions, emphatic gestures, or frequent changes in posture during communication, an animated character having a more stoic emotive, profile may express itself using more subdued facial expressions and gestures, and less body movement.

In some implementations, action 475 may be performed by software code 116/516, executed by processing hardware 104 of content enhancement system 100, and using character profile database 118/518. In other implementations, action 475 may be performed by software code 216/516, executed by processing hardware 244 of user system 240, and using character profile database 218/518.

Flowchart 470 further includes generating, using emotional aspect 517 of A/V content 112/212/512, emotion-based sign language translation 550 of A/V content 112/212/512, where emotion-based sign language translation 550 includes one or more of a gesture, a posture, or a facial expression conveying emotional aspect 517 (action 476). Action 476 may be performed by software code 116/516 executed by processing hardware 104 of content enhancement system 100, or by software code 216/516 executed by processing hardware 244 of user system 240, and using sign language translation generator 594. For example, and as shown by FIG. 5, sign language translation generator 594 may receive aggregated content analysis data 592 and emotional aspect 517 of A/V content 112/212/512 from aggregation module 590, and may generate emotion-based sign language translation 550 using aggregated content analysis data 592 and emotional aspect 517.

As further shown by FIG. 5, in implementations in which emotive profile 519 of the animated character for performing emotion-based sign language translation 550 is obtained from character profile database 518 in action 475, emotion-based sign language translation 550 may be generated in action 476 further using emotive profile 519.

In some implementations, flowchart 470 may conclude with action 476 described above. However, in other implementations, and referring to FIG. 3A in combination with FIGS. 1, 2, 4, and 5, flowchart 470 may further include providing emotion-based sign language enhanced A/V content 120/220/320/520 including A/V content 112/212/312/512 and emotion-based sign language translation 350/550 as an output for display by user system 140a-140c240/340 (action 477). Action 477 may be performed by software code 116/516 executed by processing hardware 104 of content enhancement system 100, or by software code 216/516 executed by processing hardware 244 of user system 240/340, and using content enhancement module 596.

As discussed above by reference to FIGS. 1 and 3A, in some implementations, processing hardware 104 of content enhancement system 100 may executed software code 116/515 to synchronize emotion-based sign language translation 350/550 with a timecode of A/V content 112/212/312/512 to produce emotion-based sign language enhanced A/V content 120/320/520, and to broadcast or stream emotion-based sign language enhanced A/V content 120/320/520 to user system 140a-140c/340. In some of those implementations, the performance of emotion-based sign language translation 350/550 by the animated character may be pre-rendered by content enhancement system 100 and broadcasted or streamed to user system 140a-140c/340. However, in other implementations in which A/V content 112/312/512 and emotion-based sign language translation 350/550 are broadcasted or streamed to user system 140a-140c/340, processing hardware 104 may execute software code 116/516 to generate emotion-based sign language translation 350/550 dynamically during the recording, broadcasting, or streaming of A/V content 112/312/512.

Further referring to FIG. 2, in yet other implementations in which A/V content 212/312/512 is broadcasted or streamed to user system 240/340, processing hardware 244 of user system 240/340 may execute software code 216/516 to generate emotion-based sign language translation 350/550 locally on user system 240/340, and to do so dynamically during playout of AV content 112/212/312/512. Processing hardware 244 of user system 240/340 may further execute software code 216 to render the performance of emotion-based sign language translation 350/550 by the animated character on display 248/348 concurrently with rendering A/V content 212/312/512 corresponding to emotion-based sign language translation 350.

With respect to the method outlined ley flowchart 470, it is noted that actions 471, 412, 473, and 476, or action 471, 472, 473, 476, and 477, or actions 471, 472, 473, 474, and 476, or actions 471, 472, 473, 474, 476, and 477, or actions 471, 472, 473, 475, and 476, or actions 471, 472, 473, 475, 476, and 477, or actions 471, 472, 473, 474, 475, and 476, or actions 471, 472, 473, 474, 475, 476, and 477, may be performed in an automated process from which human participation may be omitted.

Thus, the present application discloses systems and methods for providing emotion-based sign language enhancement of content. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content enhancement system comprising:
a computing platform including a processing hardware and a system memory storing a character profile database and a software code, the character profile database including a first emotive profile associated with a first animated character for conveying an emotion using one or more of a first gesture, a first posture, or a first facial expression and a second emotive profile associated with a second animated character for conveying the emotion using one or more of a second gesture, a second posture, or a second facial expression different from the first gesture, the first posture, or the first facial expression, respectively;
the processing hardware configured to execute the software code to:
receive video content;
execute a visual analysis of the video content;
determine, based on executing the visual analysis of the video content, an emotional aspect of the video content being the emotion;

identify one of the first animated character or the second animated character for performing the sign language enhancement;

obtain, from the character profile database, one of the first emotive profile or the second emotive profile corresponding to the identified one of the first animated character or the second animated character; and generate, using the emotional aspect of the video content and the obtained one of the first emotive profile or the second emotive profile, a sign language enhancement conveying the emotion using one or more of the first gesture, the first posture, or the first facial expression or one or more of the second gesture, the second posture, or the second facial expression of the obtained one of the first emotive profile or the second emotive profile, respectively.

2. The content enhancement system of claim 1, further comprising:

a display;

wherein the processing hardware is further configured to execute the software code to:

render the video content on the display; and render the sign language enhancement on the display concurrently with rendering the video content corresponding to the sign language enhancement.

3. The content enhancement system of claim 1, wherein the identified one of the first animated character or the second animated character is selectable by a user based on a subject matter of the video content.

4. The content enhancement system of claim 1, further comprising:

a display;

wherein the processing hardware is further configured to execute the software code to:

render the video content on the display for viewing by all of a plurality of users concurrently viewing the video content on the display; and contemporaneously with rendering the video content on the display, render the sign language enhancement such that the sign language enhancement is visible to at least one of the plurality of users on another display, but not all of the plurality of users concurrently viewing the video content on the display.

5. The content enhancement system of claim 1, wherein the video content is further accompanied with at least one of audio content or text, and wherein the processing hardware is further configured to execute the software code to determine the emotional aspect further based on analyzing the at least one of the audio content or the text.

6. The content enhancement system of claim 1, wherein the video content includes a plurality of video frames, and wherein the processing hardware is further configured to execute the software code to execute the visual analysis on a frame-by-frame basis.

7. The content enhancement system of claim 1, wherein the processing hardware is further configured to execute the software code to:

synchronize the sign language enhancement with a timecode of the video content to produce an enhanced video content; and record the enhanced video content, or broadcast or stream the enhanced video content to a user system.

8. The content enhancement system of claim 1, further comprising at least one machine learning (ML) model-based emotion analyzer, wherein the emotional aspect of the video content is determined using the at least one ML model-based emotion analyzer.

9. The content enhancement system of claim 1, wherein the first emotive profile defines the first animated character that is more excitable than the second animated character defined by the second emotive profile, wherein the first animated character conveys the emotion with one or more exaggerated facial expressions, emphatic gestures, or frequent changes in posture than the second animated character.

10. The content enhancement system of claim 1, wherein the first emotive profile defines the first animated character that is more stoic than the second animated character defined by the second emotive profile, wherein the first animated character conveys the emotion with one or more subdued facial expressions, subdued gestures, or less body movements than the second animated character.

11. A method for use by a content enhancement system including a computing platform having a processing hardware and a system memory storing a character profile database and a software code, the character profile database including a first emotive profile associated with a first animated character for conveying an emotion using one or more of a first gesture, a first posture, or a first facial expression and a second emotive profile associated with a second animated character for conveying the emotion using one or more of a second gesture, a second posture, or a second facial expression different from the first gesture, the first posture, or the first facial expression, respectively, the method comprising:

receiving, by the software code executed by the processing hardware, video content;

executing, by the software code executed by the processing hardware, a visual analysis of the video content;

determining, by the software code executed by the processing hardware, based on executing the visual analysis of the video content, an emotional aspect of the video content being the emotion;

identifying, by the software code executed by the processing hardware, one of the first animated character or the second animated character for performing the sign language enhancement;

obtaining, by the software code executed by the processing hardware, from the character profile database, one of the first emotive profile or the second emotive profile corresponding to the identified one of the first animated character or the second animated character; and generating, by the software code executed by the processing hardware, using the emotional aspect of the video content and the obtained one of the first emotive profile or the second emotive profile, a sign language enhancement conveying the emotion using one or more of the first gesture, the first posture, or the first facial expression or one or more of the second gesture, the second posture, or the second facial expression of the obtained one of the first emotive profile or the second emotive profile, respectively.

12. The method of claim 11, wherein the content enhancement system further comprises a display, the method further comprising:

rendering, by the software code executed by the processing hardware, the video content on the display; and rendering, by the software code executed by the processing hardware, the sign language enhancement on the display concurrently with rendering the video content corresponding to the sign language enhancement.

13. The method of claim 11, wherein the identified one of the first animated character or the second animated character is selectable by a user based on a subject matter of the video content.

14. The method of claim 11, wherein the content enhancement system further comprises a display, the method further comprising:
rendering, by the software code executed by the processing hardware, the video content on the display for viewing by all of a plurality of users concurrently viewing the video content on the display; and
contemporaneously with rendering the video content on the display, rendering, by the software code executed by the processing hardware, the sign language enhancement such that the sign language enhancement is visible to at least one of the plurality of users on another display, but not all of the plurality of users concurrently viewing the video content on the display.

15. The method of claim 11, wherein the video content is further accompanied with at least one of audio content or text, and wherein the emotional aspect is determined further based on analyzing, by the software code executed by the processing hardware, the at least one of the audio content or the text.

16. The method of claim 11, wherein the video content includes a plurality of video frames, and wherein the software code, executed by the processing hardware, executes the visual analysis on a frame-by-frame basis.

17. The method of claim 11, further comprising:
synchronizing, by the software code executed by the processing hardware, the sign language enhancement with a timecode of the video content to produce an enhanced video content; and
recording, by the software code executed by the processing hardware, the enhanced video content, or broadcasting or streaming the enhanced video content to a user system.

18. The method of claim 11, wherein the content enhancement system further comprises at least one machine learning (ML) model-based emotion analyzer, and wherein the emotional aspect of the video content is determined using the at least one ML model-based emotion analyzer.

19. The method of claim 11, wherein the first emotive profile defines the first animated character that is more excitable than the second animated character defined by the second emotive profile, wherein the first animated character conveys the emotion with one or more exaggerated facial expressions, emphatic gestures, or frequent changes in posture than the second animated character.

20. The method of claim 11, wherein the first emotive profile defines the first animated character that is more stoic than the second animated character defined by the second emotive profile, wherein the first animated character conveys the emotion with one or more subdued facial expressions, subdued gestures, or less body movements than the second animated character.

* * * * *